United States Patent
Adkins et al.

(10) Patent No.: US 8,286,678 B2
(45) Date of Patent: Oct. 16, 2012

(54) PROCESS, APPARATUS AND VESSEL FOR TRANSFERRING FLUIDS BETWEEN TWO STRUCTURES

(75) Inventors: Jimmie Dean Adkins, San Ramon, CA (US); Donald Gregory Danmeier, Oakland, CA (US); John S. Hartono, Alameda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 294 days.

(21) Appl. No.: 12/856,486

(22) Filed: Aug. 13, 2010

(65) Prior Publication Data

US 2012/0037240 A1 Feb. 16, 2012

(51) Int. Cl.
*B65B 3/04* (2006.01)
*B63B 21/02* (2006.01)
*B63B 27/30* (2006.01)

(52) U.S. Cl. ........ 141/387; 141/1; 141/231; 114/230.15; 441/4

(58) Field of Classification Search .............. 141/1, 231, 141/279, 387–388; 441/4; 114/256, 230.25, 114/230.2, 230.15
See application file for complete search history.

(56) References Cited

U.S. PATENT DOCUMENTS

| | | | |
|---|---|---|---|
| 3,332,446 A | 7/1967 | Mann | |
| 3,664,388 A | 5/1972 | Frankel | |
| 3,828,565 A | 8/1974 | McCabe | |
| 4,478,586 A | 10/1984 | Gentry et al. | |
| 4,643,614 A | 2/1987 | Laursen | |
| 4,718,459 A | 1/1988 | Adorjan | |
| 4,867,211 A * | 9/1989 | Dodge et al. | ............... 141/279 |
| 5,036,890 A | 8/1991 | Whaley | |
| 5,275,510 A | 1/1994 | de Baan et al. | |
| 5,400,602 A | 3/1995 | Chang et al. | |
| 5,728,095 A | 3/1998 | Taylor et al. | |
| 5,803,779 A | 9/1998 | Horton, III | |
| 6,003,603 A | 12/1999 | Breivik et al. | |
| 6,089,022 A | 7/2000 | Zednik et al. | |
| 6,434,948 B1 | 8/2002 | Eide et al. | |
| 6,637,479 B1 | 10/2003 | Eide et al. | |
| 6,779,949 B2 | 8/2004 | Barras et al. | |

(Continued)

FOREIGN PATENT DOCUMENTS

EP 1 051 325 B1 11/2000

(Continued)

OTHER PUBLICATIONS

CAVOTEC, Automated Mooring Systems, Jul. 2006, the Netherlands.

(Continued)

*Primary Examiner* — Timothy L Maust
*Assistant Examiner* — Timothy Kelly
(74) *Attorney, Agent, or Firm* — Karen DiDomenicis

(57) ABSTRACT

A process and apparatus are provided for transferring fluids such as, for example, liquefied natural gas between a source structure such as a floating storage vessel and a receiving structure such as a floating transport vessel utilizing a controllable deployment system to deploy a fluid conduit. The fluid conduit end is supported by a mooring device which is positioned by the controllable deployment system. A transfer vessel is also provided which utilizes the controllable deployment system to position and support a fluid conduit for connection with a manifold on a receiving vessel. The deployment system operates in active mode during positioning and in passive mode during fluid transfer. The fluid transfer system disclosed allows safe, controlled operation and fluid transfer in open sea conditions.

16 Claims, 8 Drawing Sheets

U.S. PATENT DOCUMENTS

| | | | |
|---|---|---|---|
| 6,797,443 B2 | 9/2004 | Nakao et al. | |
| 6,805,598 B2 | 10/2004 | Goldbach | |
| 6,851,994 B2 | 2/2005 | Boatman et al. | |
| 6,854,408 B2 | 2/2005 | De Baan | |
| 6,886,611 B2 | 5/2005 | Dupont et al. | |
| 6,915,753 B1 | 7/2005 | De Baan | |
| 6,923,225 B2 | 8/2005 | Poldervaart et al. | |
| 6,938,570 B2* | 9/2005 | Montgomery et al. | 114/230.1 |
| 6,983,712 B2 | 1/2006 | Cottrell et al. | |
| 7,174,931 B2 | 2/2007 | Espinasse | |
| 7,543,613 B2* | 6/2009 | Adkins et al. | 141/231 |
| 7,793,605 B2* | 9/2010 | Poldervaart et al. | 114/230.15 |
| 2004/0011424 A1 | 1/2004 | Dupont et al. | |
| 2004/0094082 A1* | 5/2004 | Boatman et al. | 114/249 |
| 2004/0129195 A1 | 7/2004 | Baan | |
| 2005/0145154 A1 | 7/2005 | De Baan | |
| 2007/0095427 A1 | 5/2007 | Ehrhardt et al. | |
| 2007/0292243 A1* | 12/2007 | De Baan | 414/141.3 |
| 2008/0243365 A1* | 10/2008 | Altman et al. | 701/116 |
| 2010/0191500 A1 | 7/2010 | Harrison et al. | |

FOREIGN PATENT DOCUMENTS

| | | |
|---|---|---|
| EP | 1 308 384 A2 | 5/2003 |
| EP | 1 462 358 A1 | 9/2004 |
| WO | 90/00589 | 1/1990 |
| WO | 99/28095 | 6/1999 |
| WO | 99/38762 | 8/1999 |
| WO | 2004/081441 | 9/2004 |
| WO | 2004/090412 | 10/2004 |
| WO | 2005/043032 | 5/2005 |
| WO | WO2006052896 | 5/2006 |
| WO | WO2007120039 | 10/2007 |

OTHER PUBLICATIONS

PCT/US2011/038331, International Search Report, mailing date May 27, 2011, pp. 1-9.

* cited by examiner

PROCESS, APPARATUS AND VESSEL FOR TRANSFERRING FLUIDS BETWEEN TWO STRUCTURES

FIELD

The present disclosure relates to a process and apparatus for transferring fluids between two structures, specifically an apparatus for supporting and deploying an end of a fluid transfer conduit on one structure so that fluid connection to the other structure may be established. Additionally, the present disclosure relates to a transfer vessel for transferring fluids between vessels in open sea conditions.

BACKGROUND

Transferring fluids between floating vessels on the open ocean in unprotected locations offers particular hazards in terms of personnel safety and damage to the vessels or facilities involved. The fluids which are transported in a transport vessel from a remote location may be delivered to either a tank located at an offshore facility, or by pipeline to a land-based receiving terminal. Offshore tank storage facilities may either be floating or settled on the seafloor.

No commercially proven technology exists that allows fluid transfer in harsh open ocean conditions between standard (non-dedicated) transport vessels or between such standard vessels and floating production and/or storage vessels. As an example, a floating storage vessel is a fixed asset near a market site that could be used for storing fluids for eventual delivery to on-shore facilities. For such floating storage vessels to become technically and commercially viable in many locations, a reliable fluid transfer system is needed that can transfer fluids between the storage vessel and standard transport carriers and other vessels having diverse features and configurations under a variety of conditions and with a sufficiently high berth availability.

Commercially proven technologies exist for oil transfer in harsh open ocean conditions, but such technologies require dedicated transport carriers with extensive bow modifications. Conversely, commercially proven technologies exist for oil transfer between a standard oil carrier and a floating storage vessel or a single point moored (SPM) buoy under benign sea conditions, however these conventional systems cannot operate in harsh open ocean conditions due to marine operations issues and safety concerns with support vessels, e.g. tugboats and offshore service vessels. No commercially proven system exists that can transfer fluids between a standard oil, gas or product carrier and a floating storage vessel in harsh open ocean conditions.

Conventionally, fluid transfer to and from floating transport vessels is most often accomplished thru articulated hard-pipe loading arms, such as, for example, an arm utilizing a Chiksan® swivel joint available from FMC Technologies, Inc., Houston, Tex. Fluid transfer operations using such loading arms generally require relatively benign conditions, such as those found in sheltered locations in harbors or behind breakwaters. As a result, many fluid transfer terminals currently in operation are located onshore, in harbors, bays, rivers or waters that are sheltered from open ocean conditions. Requiring protected fluid transfer sites limits the number of potential sites for new terminals, and in many regions a suitable site simply is not available. For example, on the U.S. west coast, few shallow water sites are available and meteorological and oceanographic (metocean) conditions (e.g., sea states, currents and winds) limit the number of potential solutions. Applying articulated loading arm technology in an open ocean location has been contemplated by some fluid transfer terminal projects. In shallow water locations with milder metocean conditions, a gravity based structure (GBS) which serves as a breakwater, thus allowing loading arms to be used in a side-by-side berthing layout, is a technically feasible solution. In deeper water applications, a floating storage vessel that is single point moored allows the vessel to weathervane into the dominant metocean conditions, thus minimizing floating storage vessel motions. Loading arms have been proposed for fluid transfer between two vessels in a side-by-side berthing (mooring) arrangement, but have not been employed to date for a variety of reasons. Unlike a GBS, a floating storage vessel does not serve as a breakwater, and thus side-by-side moorings must take the full force of the metocean conditions. Predicting the relative motions between the vessels with the necessary high degree of certainty has thus far proven to be difficult. Optimizing the mooring line arrangement in a side-by-side mooring is difficult in that the vessels are often very close in overall length, and thus proper bow and stern mooring line geometries cannot be achieved. Also, tugboat operational problems are further compounded by the approach layout in a side-by-side berthing. Additional concerns include damage to the vessels due to high relative motions between the vessels, and increased potential for breakout due to high loads on the mooring lines. All these issues combine to produce significant concerns for conventional fluid transfer systems in side-by-side offshore berthing concepts, and thus the ability to meet fluid delivery commitments.

Development work to date on new offshore fluid transfer systems has primarily concentrated on vessels that are moored in a tandem arrangement. This applies to the transfer of cryogenic fluids, where the development work has primarily concentrated on aerial systems and more recently on floating hose systems. It has been found that these systems can require the use of dedicated transport carriers which use complicated and expensive technology which often is not widely endorsed by the maritime industry and which can be difficult to operate in other than benign weather conditions. None of these systems have solved the problem of how to safely deliver and connect the fluid transfer hose, pipe or conduit between vessels in harsh open ocean conditions. Other 'in-water' bottom founded systems have been conceptualized, as well as a variety of platform based concepts, all of which utilize either loading arms or aerial hoses, but have yet to resolve the problems stated above.

There has been renewed interest in the industry in floating hose based transfer systems, particularly for cryogenic fluids. The appeal of a floating hose based system is that it mimics tandem ship-to-ship oil transfer systems, which are well understood, and have a proven history of safe, successful operation in relatively benign environments. However, there are several significant concerns for any floating hose system for cryogenic fluid transfer. Hose manufacturers have only recently begun work to explore ways to retrieve and deploy the hose between liftings, and there are technical difficulties with the existing concepts. In particular, the means of lifting the hoses out of the water and connecting them to the floating transport vessel manifold and supporting them during the transfer operation is problematic and has yet to be defined. Moreover, how to manage the hoses during an emergency disconnect is likewise unresolved.

For floating hose based oil transfer systems, a system capable of operating in harsh open ocean environments and of connecting to a standard carrier's midship manifold would significantly improve operability and safety while elevating terminal berth availability.

It would be desirable to have a fluid transfer system that provides safe operation, high berth availability, universal applicability, regardless of ship design and features, and convenient conduit handling methods for offshore fluid transfer between floating vessels. It would further be desirable for the fluid transfer system to be supported by the hull structure and not supported by the manifold flanges. It would further be desirable to have a fluid transfer system in which a fluid flow conduit is attached to a standard manifold flange on the transport vessels without exceeding the allowable design loads, i.e. axial force and shear. It would further be desirable to have a fluid transfer system that could accommodate standard floating transport vessels with few modifications.

SUMMARY

One embodiment relates to a fluid transfer apparatus for accommodating the transfer of fluid between a floating first structure and a second structure, the apparatus comprising:
   a) a mooring device capable of being releasably attached to a floating first structure having a first structure conduit;
   b) a first controllable deployment system supported by a base, the controllable deployment system supporting the mooring device and capable of adjusting the position of the mooring device relative to the base; and
   c) at least one fluid conduit displaceably supported relative to the mooring device and having a fluid conduit end adapted to be releasably connected to the first structure conduit;
wherein the mooring device can be moved relative to the base by the first controllable deployment system so that the mooring device can be releasably attached to the floating first structure such that the mooring device moves with the floating first structure and the fluid conduit end can be displaced relatively to the mooring device to accommodate mating of the fluid conduit end with the first structure conduit.

Another embodiment relates to a process for transferring fluid between a floating first structure and a second structure, the process comprising, in sequence:
   operating a first controllable deployment system in active control mode to adjust the position of a mooring device supporting a fluid conduit end of at least one fluid conduit with respect to a first structure conduit on a floating first structure;
   attaching the mooring device to the floating first structure;
   disabling active control of the first controllable deployment system so that the first controllable deployment system is free to move relative to the mooring device thereby allowing the mooring device to move with the floating first structure;
   individually adjusting the position of the fluid conduit end of the at least one fluid conduit with respect to the mooring device and to the first structure conduit using a second controllable deployment system;
   fluidly connecting the fluid conduit end to the first structure conduit; and
   transferring fluid between the floating first structure and the second structure through the at least one fluid conduit and first structure conduit.

Figure 1:
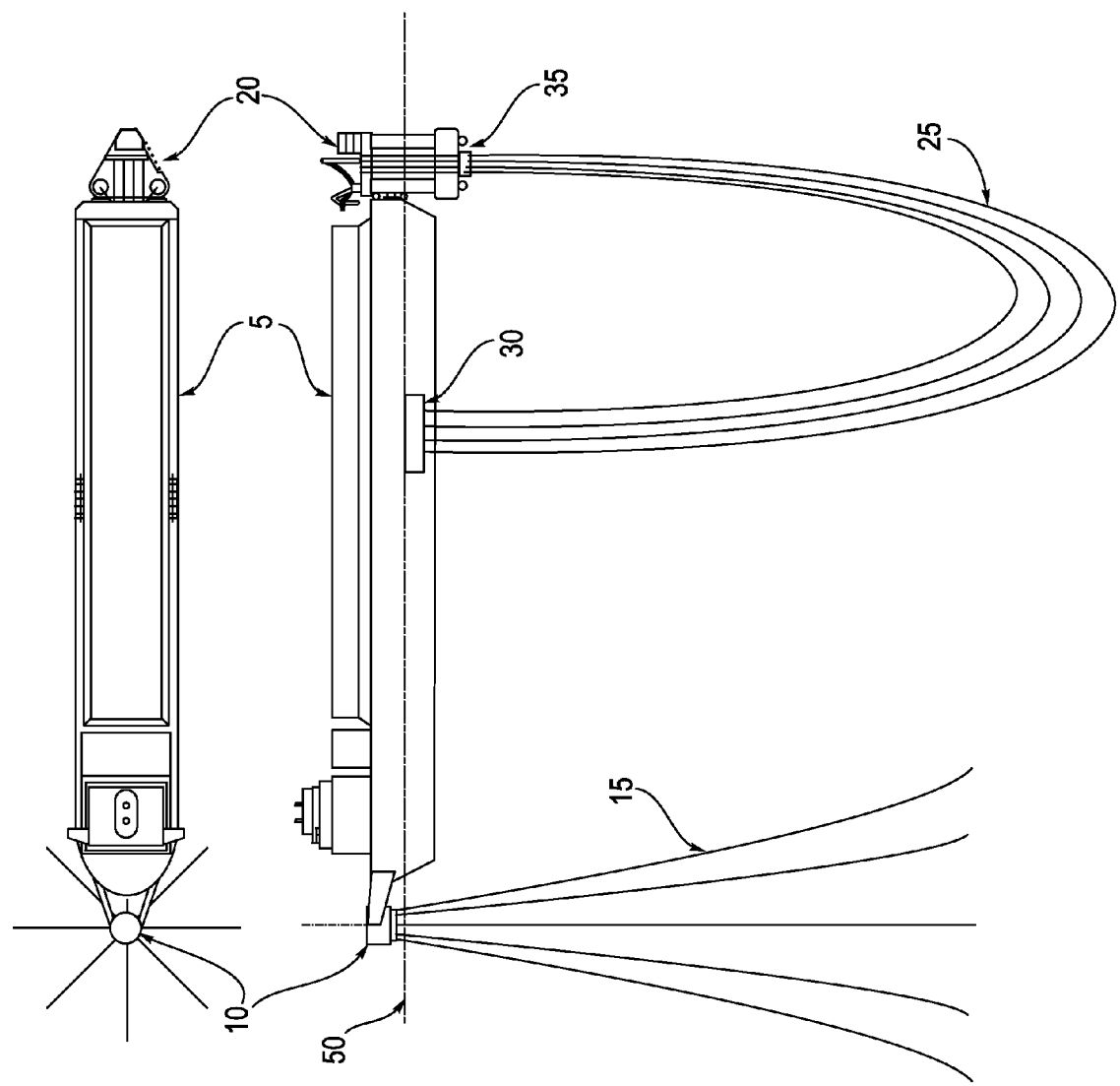
FIG. 1 illustrates one embodiment in which a fluid transfer system on a floating structure, i.e., a transfer vessel, is moored on the stern of a floating storage and off-loading (FSO) vessel with attached transfer conduits.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routine undertaking for those of ordinary skill in the art having the benefit of this disclosure.

In this disclosure, the terms "fluid" and "flowable product" refer to liquids, gases, and mixtures thereof. More specifically, flowable product may comprise hydrocarbons, alcohols and other materials in various states of production or refinement. Nonlimiting examples of fluids and flowable products include liquefied natural gas, liquefied heavy gas, liquefied petroleum gas, compressed natural gas, natural gas, crude oil, gasoline, diesel, aviation fuel, fuel oil, Syncrude, petroleum condensate, lubricating oil, synthetic lube oil, naphtha, methanol and mixtures thereof.

Liquefied natural gas (LNG) is a cryogenic fluid comprising predominately methane ($C_1$) with decreasing amounts of $C_2$+ hydrocarbons, and is sufficiently cold to remain in a liquid state at near atmospheric pressures. Liquefied heavy gas (LHG) is a cryogenic fluid comprising predominately $C_1$ hydrocarbons, with lesser amounts of $C_2$ thru $C_4$, and with decreasing amounts of $C_5$+ hydrocarbons, but requires pressurization (often between 500 and 750 psig) to remain liquid at temperatures well above that of LNG. Liquefied petroleum gas (LPG) is a near-cryogenic fluid comprising predominately $C_3$ and $C_4$ hydrocarbons, which can either be refrigerated to remain liquid at near atmospheric pressures or pressurized to remain liquid at atmospheric temperature. All of the above mentioned fluids can be transferred in the embodiments disclosed herein.

In the following embodiments, fluid is transferred between first and second structures which are subject to relative motion there between.

In some embodiments, fluid is transferred between floating vessels designed for handling, processing, storing and/or transporting the fluid.

In some embodiments, fluid is transferred between a fluid transport vessel for transporting the fluid between locations and a second floating vessel. The second floating vessel may be a floating storage vessel for the fluid, located at or near the site where the fluid is prepared, or at or near the market site. Further, the second floating vessel may have on-board facilities for processing the fluid, adding heat to regassify the fluid, and optionally for preparing the fluid for passage into a delivery system such as a pipeline for transport to a market site. Nonlimiting examples of floating storage vessels include floating storage and offloading (FSO) vessels, floating production storage and offloading (FPSO) vessels, floating liquefied natural gas (FLNG) vessels, floating storage and regasification unit (FSRU) vessels, LNG carriers, and LNG ice-breaking carriers.

In some embodiments, fluid is transferred between a transfer vessel and a fluid transport vessel. A transfer vessel is utilized to allow fluid transfer between the floating vessels. In one embodiment, the transfer vessel can be moored or "parked" at the stern of a floating storage vessel. The transfer vessel supports the first end of a conduit. Prior to the arrival of the floating transport vessel, the transfer vessel moves away from the floating storage vessel with the conduit, which allows the floating transport vessel to tandem moor to the floating storage vessel using, for example, a conventional hawser system as would be familiar to the skilled artisan. With the aid of a dynamic positioning system (as further described herein) with propulsion thrusters, the transfer vessel moves to the floating transport vessel and holds station (i.e., holds a position relative to the floating transport vessel) alongside the midship manifold. An apparatus for transferring fluid between the transfer vessel and the floating transport vessel, referred to herein interchangeably as the fluid transfer apparatus and the fluid transfer system, including at least one fluid conduit, a first controllable deployment system for adjusting the position of the aerial fluid conduit and a releasable mooring device supporting the free or movable end of the fluid conduit is operated to attach the mooring device to the side (i.e., the hull) of the floating transport vessel. The fluid conduit is then connected to the manifold flange of the floating transport vessel and fluid transfer commences.

Once fluid transfer operations are completed, the fluid transfer conduit can be disconnected and retracted from the midship manifold. The mooring device is then released and the first controllable deployment system (as further described herein) is retracted away from the floating transport vessel. The transfer vessel then backs away from the floating transport vessel, which unberths and departs from the floating storage vessel. The transfer vessel moves back into the "parked" position on the stern of the floating storage vessel and moors at the stern utilizing the releasable mooring device. The fluid transfer system can be connected to the storage vessel and maintained in a "ready to operate" state at normal pressures and/or temperatures as appropriate. Alternatively, the fluid transfer system can be cross connected on the transfer vessel and fluids recirculated back to the storage vessel via a conduit and thus maintained in a "ready to operate" state at normal pressures and/or temperatures as appropriate. In the case of cryogenic fluids, either arrangement can be utilized to recirculate the fluid to maintain cryogenic temperatures and preclude boil off gas generation, or the system can remain static (no flow) and boil off gas collected and vented or routed to a safety system.

Figure 3:
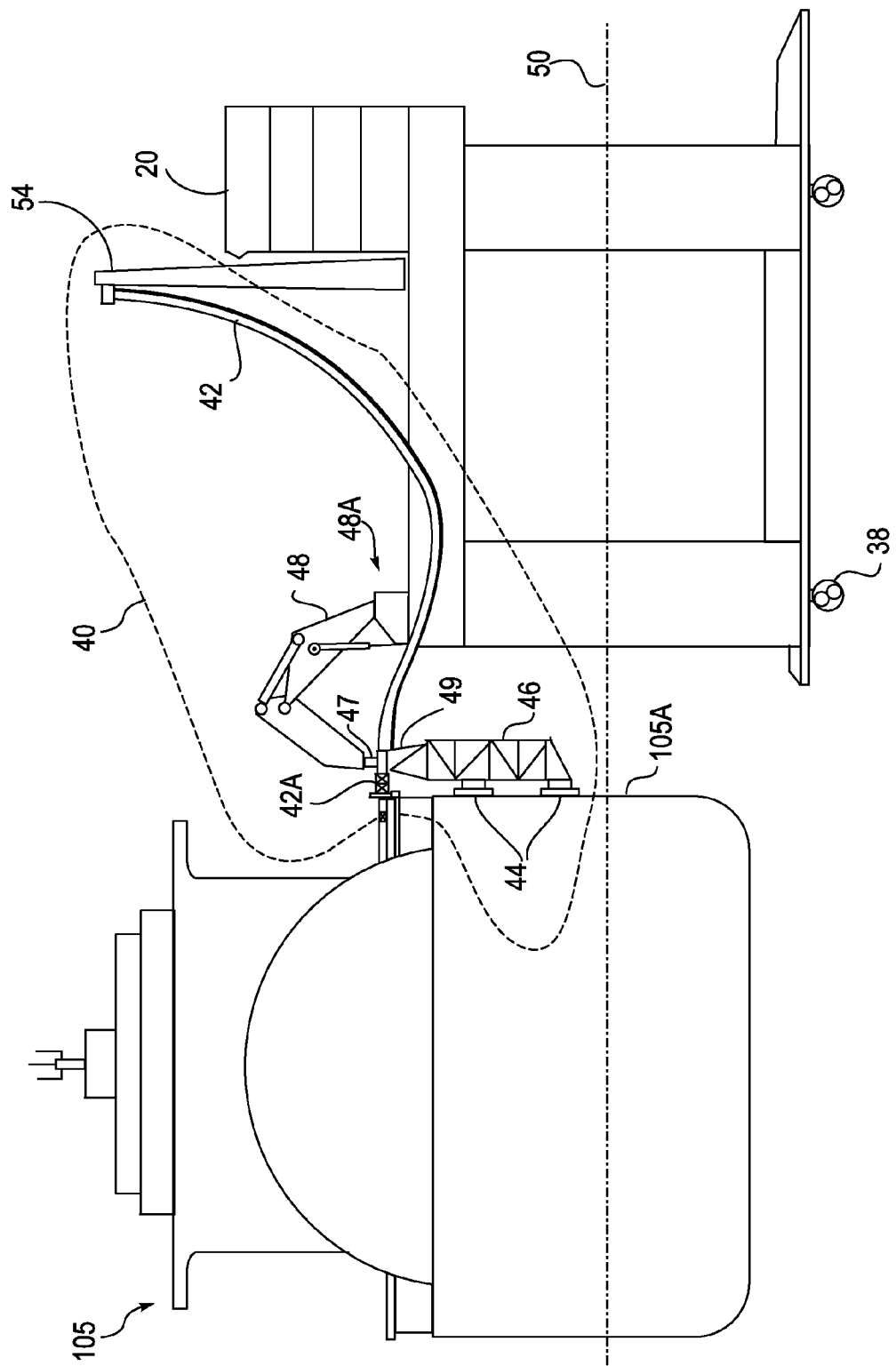
FIG. 3 illustrates one embodiment in which a transfer vessel is holding station off a floating transport vessel, a fluid transfer system is engaged and moored to the transport vessel hull, and the fluid conduits are connected to the transport vessel midship manifold.
Figure 4:
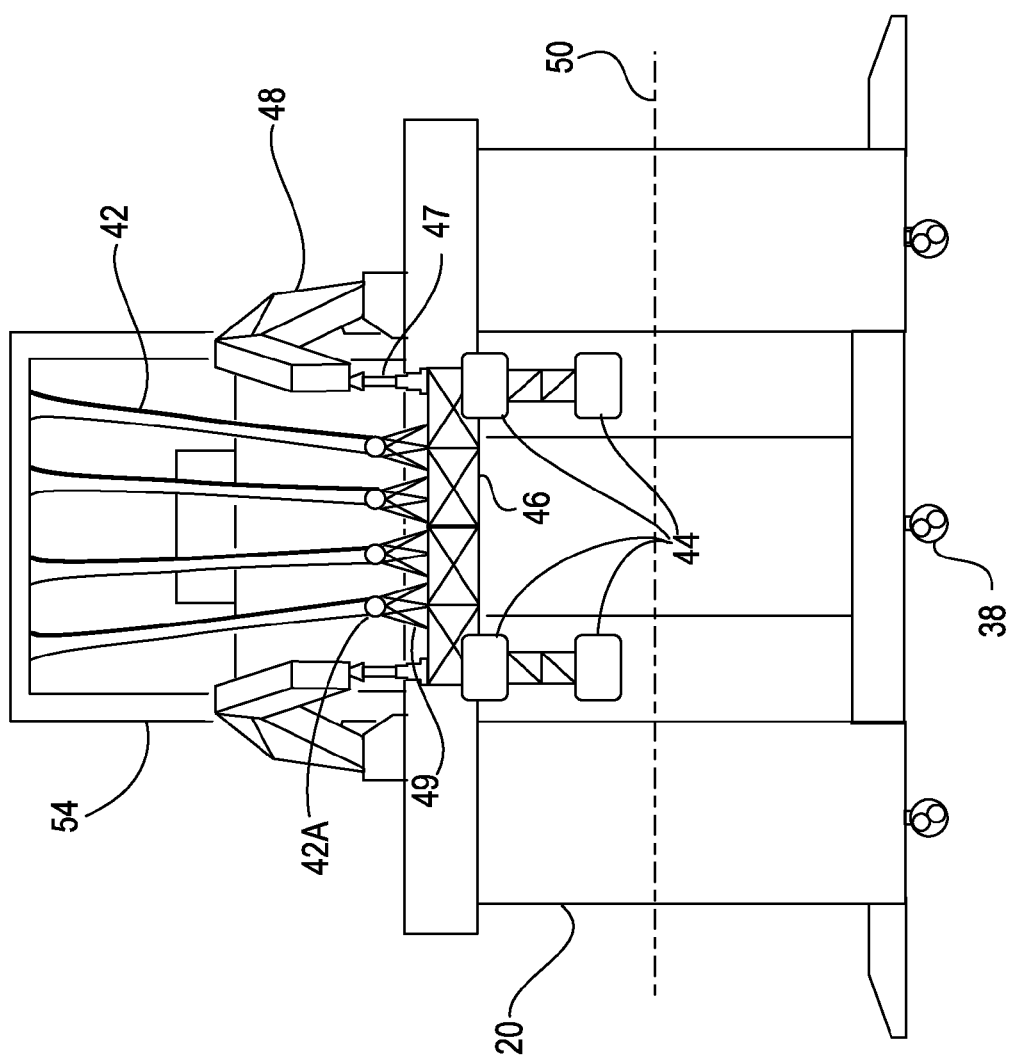
FIG. 4 illustrates a front view of a transfer vessel according to one embodiment.

In one embodiment, the transfer vessel is a vertical semi-submersible vessel, having ballast, particularly designed for the purpose described. Otherwise, the transfer vessel may be any form of service boat, offshore supply vessel or other type of vessel with sufficient stability and capacity to meet the service duty, including, but not limited to, barges, offshore supply vessels, tugboats, supply boats, catamarans, buoys, spars and the like. The transfer vessel illustrated in FIGS. 3 and 4 is a three column semi-submersible, although a four column semi-submersible would also be suitable. The three column semi-submersible can include a system of heave dampening plates useful to reduce vertical motion of the transfer vessel. The transfer vessel includes at least one flexible aerial fluid conduit having a fixed end supported by a structural support on the semi-submersible and a movable end generally supported by a first controllable deployment system with a releasable mooring device. The fixed end can be connected to a transfer conduit in fluid communication with a source or destination of fluid intended to be transferred, including, but not limited to, a floating vessel, a floating buoy or a storage tank.

Reference is now made to an embodiment illustrated in FIG. 1. A floating storage vessel 5 is moored by a single point mooring turret 10. The turret is anchored to the sea floor via anchor lines 15. A transfer vessel 20, positioned on the stern of the storage vessel, supports one end of a multiplicity of transfer conduits 25 at support connection means 35. The other end of each transfer conduit is supported on the storage vessel at support connection means 30. The connection means for attaching the transfer conduit to the storage vessel can be located on the midship manifold, which is intended for delivering the fluid to various tanks in the storage vessel. Any connection means with which the storage vessel is supplied is suitable for use. Example connection means which are useful include a flanged connector or a quick connect/disconnect coupling. An in-line swivel can be provided on each hose to allow the hose to rotate, thus eliminating any torsional concerns imparted in the hose during connection, during use, or during transfer from one vessel to another.

In some embodiments, the transfer conduits 25 are for use in delivering a fluid to (or from) the storage vessel. Each transfer conduit can be substantially submerged in water below mean water level 50, with one end of the conduit being supported out of the water by the storage vessel 5 and the other end of the conduit being supported in the water below the wave zone by the transfer vessel 20. Alternatively, the other end of the transfer conduit can be supported out of the water by the transfer vessel. The transfer vessel is also provided with fluid transfer system 40 and a dynamic positioning thruster system 38, described further herein.

Although a subsea catenary transfer conduit 25 is illustrated in FIG. 1, it is also possible to use other types of transfer conduit, including, but not limited to, a floating conduit, a pipe supported by a floating jetty or arm, or a pipe supported by a subsea submerged jetty or arm. Other embodiments of the transfer conduit include a multiplicity of conduits (e.g., pipes) supported by a floating or submerged jetty or arm that connects the storage vessel to the transfer vessel. The jetty or arm can be articulated at the stern of the storage vessel, and can simply trail behind the storage vessel when not in use. The jetty or arm can propel itself to the side of the storage vessel and out of the way to allow a transport vessel to hawser moor to the storage vessel, after which it can hold station at the midship manifold of the transport vessel with the dynamic positioning thruster system. Floating conduits can be stored on reels on the storage vessel, and permanently connected to the storage vessel fluid system by piping and swivels.

Any number of transfer conduits, including a single conduit, is encompassed within the scope of the embodiments. In the example of LNG transfer, it is desirable to have at least one cryogenic liquid delivery conduit and at least one vapor return conduit.

Floating storage vessels can include vessels identified by one of a number of terms, such as a Floating Storage & Regas Unit (FSRU) vessel, a Floating Liquefied Natural Gas (FLNG) vessel, a Floating Production, Storage and Offloading (FPSO) vessel, or a Floating Storage and Offloading (FSO) vessel. In one embodiment, each transfer conduit is supported on the storage vessel, and passes through a hawse pipe through a double wall ballast tank. The hawse pipe arrangement mitigates concerns with wave loadings on the conduit as it exits the storage vessel well below the high energy wave zone. Use of the hawse pipe configuration also provides an opportunity to install articulated loading arms on the storage vessel. This allows side-by-side fluid transfers should periods of mild metocean conditions exist, and also provides a back-up system should the fluid transfer system become unavailable.

With the transfer vessel holding station alongside the transport vessel's midship manifold, the first controllable deployment system begins moving the movable end(s) of the flexible aerial fluid conduit(s), also referred to herein as the "fluid conduit end," towards the transport vessel. The first controllable deployment system can utilize any of a variety of known position sensing and control systems in order to track the movement of the transport vessel. The mooring device of the fluid transfer system is guided to and contacts or "lands on" a pre-determined target on the side of the transport vessel near its midship manifold. The mooring device is securely attached or moored to the side of the transport vessel, thus transferring the loads of the movable end(s) of the flexible aerial fluid conduit(s) to the hull of the transport vessel.

With the mooring device securely attached to the transport vessel, the positioning arms are de-energized, i.e. taken out of active control mode, and put into passive mode and allowed to freely move with the motions of the two vessels, i.e., free to move in six degrees of freedom, and do not dampen or restrict the motion of either vessel. With the outboard weight of the fluid transfer system carried by the mooring device and the motions eliminated between the mooring device and the transport vessel, the fluid conduit end position can be adjusted and connected to the manifold flange of the transport vessel, and fluid transfer started. Thus, the fluid conduit can be conveniently attached to the midship manifold without the need for modifications to the standard transport vessel. The fluid conduit is displaceably supported relative to the mooring device to provide relative positioning capability (i.e., displacement) between the end of the conduit and the mooring device. Such relative positioning capability can be provided by a second controllable deployment system. For one, relative positioning capability is needed to allow clearance between the end of the conduit and the manifold flange while the mooring device is moved into position on the hull of the transport vessel. Second, the dimensions of the manifold flanges on an LNG carrier are not standardized, so relative positioning capability is needed to accommodate variation in spacing and pipe size.

The transfer vessel can provide a platform to install a valve manifold being connected to the conduit(s). An exemplary use of the valve manifold is directing liquid product and vapor return to the correct fluid path and manifold flange on the product transport vessel. Another exemplary use of the valve manifold is directing a flow back to the storage vessel between loadings or during idle periods in fluid transfer operations.

Liquid booster pumps can optionally be installed on the transfer vessel to assist the transport vessel in overcoming frictional losses in the system, to mitigate boil off gas generation, or to increase product transfer flowrates and reduce overall product transfer durations. This obviates the need to upgrade each product transport vessel with higher capacity pumps, or to operate at reduced flowrates. In a fluid loading scenario, booster gas compression can be installed on the transfer vessel to assist in returning boil off gas from the transport vessel back to the storage vessel, thus reducing back pressure in the transport vessels cargo tanks, increasing product transfer flowrates and reducing overall product transfer durations. This obviates the need to upgrade each product transport vessel with higher capacity return gas compressors, or to operate at reduced flowrates.

A dynamic propulsion thruster system can be provided to propel the transfer vessel between the storage vessel and the transport vessel, and to hold the transfer vessel in position relative to the transport vessel, within a pre-defined operating envelope, i.e. holding station. The thrusters may be powered by generators on the transfer vessel or by power line(s) or cables(s) from another vessel.

Figure 2:
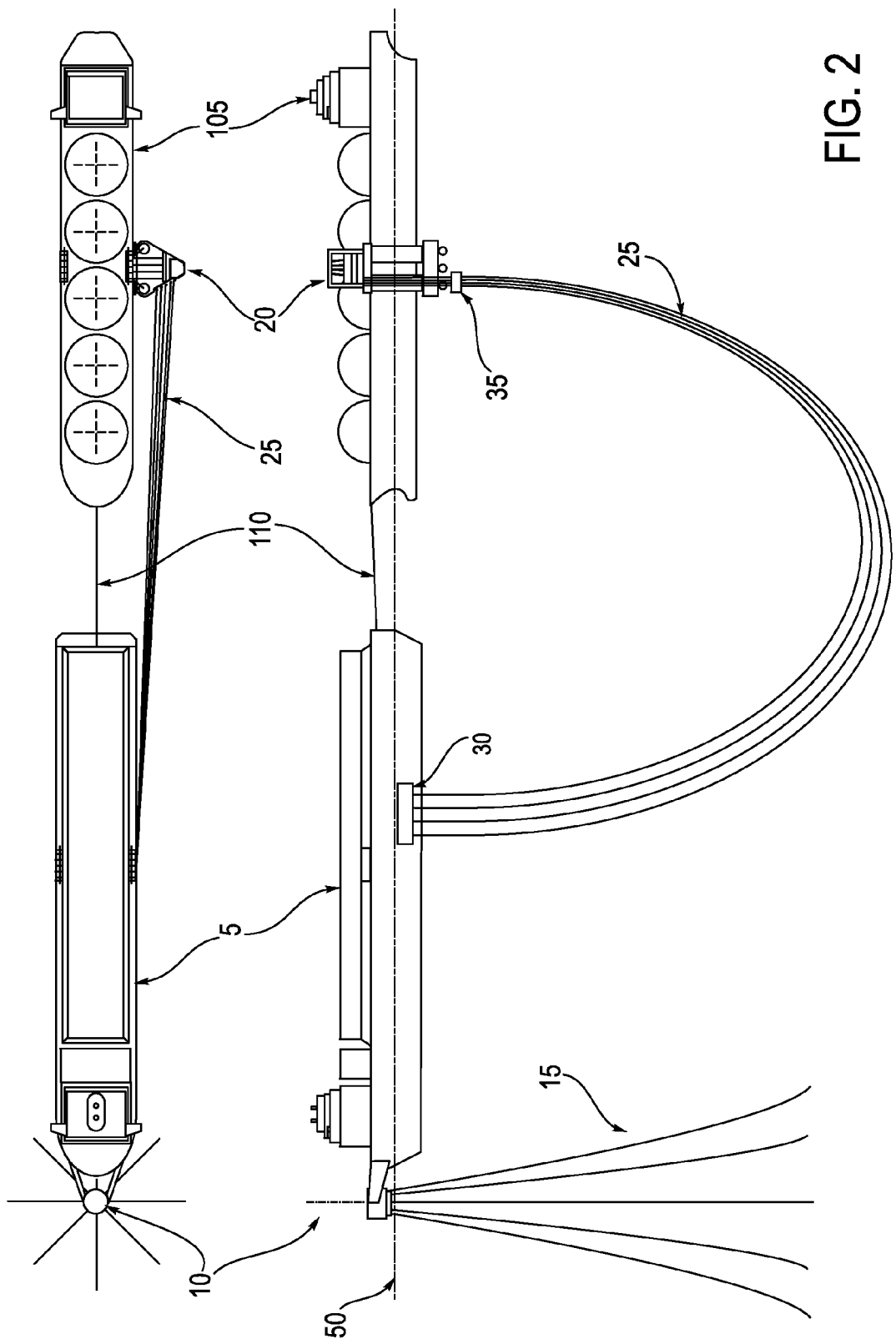
FIG. 2 illustrates one embodiment in which a FSO vessel and a transport vessel are shown in a tandem ship-to-ship mooring arrangement, with conduits and a transfer vessel in place for transferring fluid between the transport vessel and the FSO vessel.

FIG. 2 illustrates a floating transport vessel 105 in tandem ship-to-ship mooring arrangement with a floating storage vessel 5. The storage vessel is moored by a single point mooring turret 10, which is anchored to the sea floor via anchor lines 15. Transport vessels of this type are identified by one of a number of terms, such as a crude oil carrier, a refined product carrier, an LNG carrier (LNGC), an LNG ice-breaking carrier or an LPG carrier. The floating transport vessel may be any sea-going vessel equipped to transport a fluid, such as a liquefied natural gas or liquefied petroleum gas, from a production or storage site to the storage vessel, or vice versa. The transport vessel is generally equipped with a midship manifold. In the embodiment illustrated in FIG. 2, the transport vessel is attached to the storage vessel by a hawser 110. Such an arrangement permits the storage vessel and the transport vessel to move independently to some degree in response to wave action and the wind, while maintaining the general tandem configuration.

After the transport vessel is positioned and secured to the storage vessel, the transfer vessel 20 moves into place and holds station relative to the transport vessel with the aid of the dynamic positioning and thruster propulsion system. Fluid conduits from the transfer vessel are then connected to the midship manifold to allow fluid transfer to commence while the transfer vessel holds station with respect to the transport vessel.

FIGS. 3 and 4 illustrate nonlimiting embodiments of the fluid transfer system 40 on transfer vessel 20, which includes at least one aerial flexible fluid conduit 42, a first controllable deployment system with controllable positioning arms 48, a mooring device with structural supports 46 and mooring pads 44, and a second controllable deployment system 49 and a connection and safety release means associated with each fluid conduit end.

Each flexible conduit 42 includes an end attached to the transfer vessel 20 (fixed on frame 54), and a fluid conduit end 42A for connection to the transport vessel (not shown). Each end of the fluid conduit(s) includes a termination flange (not shown), as well as a bend stiffener (not shown) to preclude excessive stresses at the interface between the flexible pipe and the end termination flange. Each fluid conduit end includes a section of hard pipe, an emergency release system (ERS) between two emergency block valves and a quick connect/disconnect coupler (QC/DC) (not shown), as would be familiar to the skilled artisan.

Each fluid conduit end can be releasably connected to a conduit intended to receive (or supply) fluid on another vessel, such as, for example, a floating transport vessel or a floating storage and offloading vessel. The fluid conduit aperture intended to receive (or supply) the transferred fluid can be a midship manifold, for example. FIG. 4 shows, as an example, four flexible aerial conduits 42, three conduits for transferring fluid and one conduit for vapor return gas in the case of LNG transfer. Aerial flexible fluid conduits for cryogenic service can be of stainless steel bellows or composite materials design. An exemplary flexible fluid conduit of stainless steel bellows design can be provided by the OCT Group (Framo Engineering, Seaflex AS and Nexans Germany), Bergen, Norway, or by Technip France, Paris, France. An exemplary flexible fluid conduit of composite materials design can be provided by Single Buoy Moorings (SBM), Monaco, or by Bluewater Energy Services B.V., The Netherlands.

The mooring device supporting the fluid conduit end(s) generally provides structural support for the conduit ends and provides a means for attaching the structural support to another vessel, such as a floating transport vessel. In one embodiment, as illustrated, the mooring device includes structural support in the form of truss work 46 as well as vacuum mooring pads 44 mounted onto the vertical face of the truss work. As illustrated in FIG. 3, the vacuum mooring pads are capable of being releasably attached to a surface of another vessel, such as a vertical surface e.g., the hull 105A of a transport vessel. An exemplary vacuum mooring pad system is a releasable air vacuum pad mooring system such as the MoorMaster® system, which is commercially available from Cavotec MoorMaster Ltd., Christchurch, New Zealand. In an alternative embodiment, not shown, electromagnets can be used in place of vacuum pads. In yet another embodiment, not shown, the mooring device can utilize a structural-mechanical connection device such as, for example, a latching pin arrangement.

The position of the fluid conduit end is monitored, controlled and adjusted by a first controllable deployment system on the transfer vessel. The first controllable deployment system includes at least one controllable positioning arm 48, such as an automatically controlled hydraulically actuated mechanical arm with a base 48A fixed on the transfer vessel 20 structure and a movable end supporting the mooring system truss work 46. The arm is attached to the truss work in such a way that truss work can be moved in three directions of translation and three directions of rotation (six degrees of freedom). A swivel joint 47 can be used between the positioning arm and the truss work. The positioning arm can be actively controlled in active control mode by any number of known positioning and translational measurement and control systems. The positioning arm(s) 48 allows the fluid conduit end 42A to be positioned and then moored to the intended transfer connection area on another vessel, such as a floating transport vessel or a floating storage and offloading vessel. Thus, the fluid conduit ends 42A can be positioned, moored and supported in the general vicinity of the midship manifold of a standard transport vessel without the need for modifications to the transport vessel.

Before the fluid conduit ends can be positioned for connection, the transfer vessel is positioned near the transport vessel, within a defined relative-position operating envelope with respect to the transport vessel. In order to position the two vessels within this operating envelope, a positioning and propulsion system capable of propelling the transfer vessel and maintaining the position of the transfer vessel is used. A nonlimiting example of such a positioning and propulsion system is a dynamic positioning thruster system available from Kongsberg Maritime AS, Kongsberg, Norway. The positioning system can utilize thrusters 38 (e.g., propellers having variable thrust and directional control) from any number of known suppliers.

Once the mooring device on the fluid transfer system moors to the transport vessel, as shown in FIG. 3, the active control of the positioning arm 48 is disabled and the positioning arm is switched to passive mode in which the positioning arm is free to move in up to six degrees of freedom (i.e., in three translational directions and three rotational directions). The mooring device, namely truss work 46 and vacuum mooring pads 44 in the embodiment illustrated in the figure, thereby moves with the receiving vessel and any relative motions are essentially eliminated between the transport vessel and the fluid conduit ends 42A. With the mooring device attached to the transport vessel hull 105A, the loads from the movable end of the transfer system are supported and carried by the transport vessel hull, not by the manifold flanges.

In some embodiments, the fluid transfer system further includes a second controllable deployment system for individually deploying and adjusting the position of each fluid conduit with respect to the intended fluid conduit on the transport vessel. As illustrated in FIG. 4, the second controllable deployment system can be at least one Stewart platform 49 supported by the mooring device truss work 46, with the Stewart platform supporting the fluid conduit ends 42A. The Stewart platform adjusts the quick connect/disconnect coupling (QC/DC) located at the end of each conduit to align to the fluid conduit aperture on the transport vessel and then attaches, completing the fluid connection. Each Stewart platform is individually controlled, and can be actuated by any appropriate known means, such as by hydraulics or by an electro-mechanical device. A Stewart platform is a device having a base and a platform interconnected by at least three independent connections each of which is variable in length and is mounted to the base and platform, in a way in which provides six degrees of freedom. The Stewart platformcan have six independent connections pivotally mounted to the base and platform. Thus, by varying the relative lengths of the connections, the orientation and position of the platform relative to the base may be varied. The Stewart platform is also known as a Generalised Stewart Platform (GSP), or a Stewart-Gough Platform. Examples of such GSPs are disclosed in U.S. Pat. Pub. No. 20100191500A1, U.S. Pat. No. 5,728,095 and WO 99/28095. Exemplary Stewart platforms are available from Kongsberg Maritime AS, Norway.

Fluid can then be transferred between the transport vessel and the storage vessel, through the fluid conduit(s), across the transfer vessel and the transfer conduit, or vice versa. FIG. 3 illustrates the transfer vessel 20 connected to the transport vessel 105 with the fluid transfer system 40 engaged such that fluid can be transferred.

The present disclosure further provides for the orderly and safe disconnection of the fluid transfer system. In one embodiment, after the desired amount of fluid has been transferred, the flow of fluid is ceased. The fluid conduit is depressurized, drained, purged, disconnected, and retracted away from the manifold on the transport vessel. Active control of the positioning arm is re-engaged and the mooring device is detached from the receiving vessel, and the entire transfer system 40 is retracted away from the transport vessel. According to one embodiment, the mooring pads are released without the need for ballasting the transfer vessel.

At this point, the transfer vessel 20 can back away from the floating transport vessel 105, and the tandem mooring hawser from the storage vessel is released, which un-berths the transport vessel which is then free to depart the terminal. At this point the transfer vessel can move back into the "parked" position on the stern of the floating storage vessel 5. The fluid transfer system can be connected to the storage vessel and maintained in a "ready to operate" state at normal pressures and/or temperatures as appropriate. Alternatively, the fluid transfer system can be cross connected on the transfer vessel and fluids recirculated back to the storage vessel via a fluid conduit and thus maintained in a "ready to operate" state at normal pressures and/or temperatures as appropriate. In the case of cryogenic fluids, either arrangement can be utilized to recirculate the fluid to maintain cryogenic temperatures and preclude boil off gas generation, or the system can remain static (no fluid flow) and boil off gas collected and vented or routed to a safety system.

Figure 5:
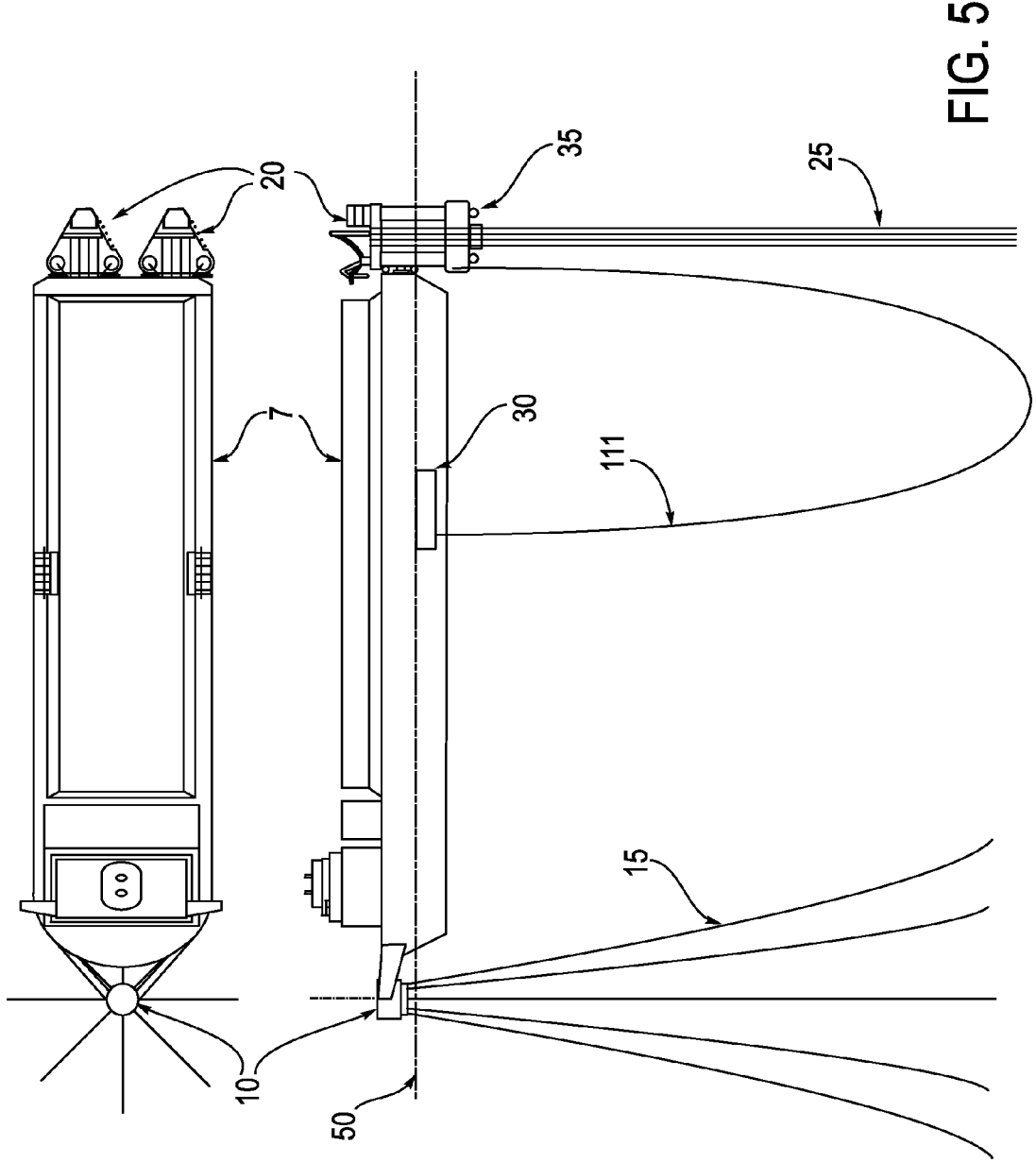
FIG. 5 illustrates one embodiment in which two transfer vessels are moored with a floating storage vessel.

In one embodiment, fluid is transferred between two transport vessels. One transport vessel can be designed for transporting the fluid from one location to a vessel such as a mooring barge under certain circumstances, such as, for example, through sheet ice, and the other transport vessel can be designed for transporting the fluid from the mooring barge to a second location under different circumstances, such as, for example, high speed trans-Atlantic service. FIG. 5 illustrates a mooring barge 7 with two associated transfer vessels 20 parked or moored on the mooring barge 7 for supporting conduits 25 between fluid transfers. Also, as shown, an auxiliary power line 111 may be connected between the mooring barge and at least one of the transfer vessels. The auxiliary power line can supply additional power to the transfer vessel 20, i.e. for operation of booster pumps, thrusters, etc.

Figure 6:
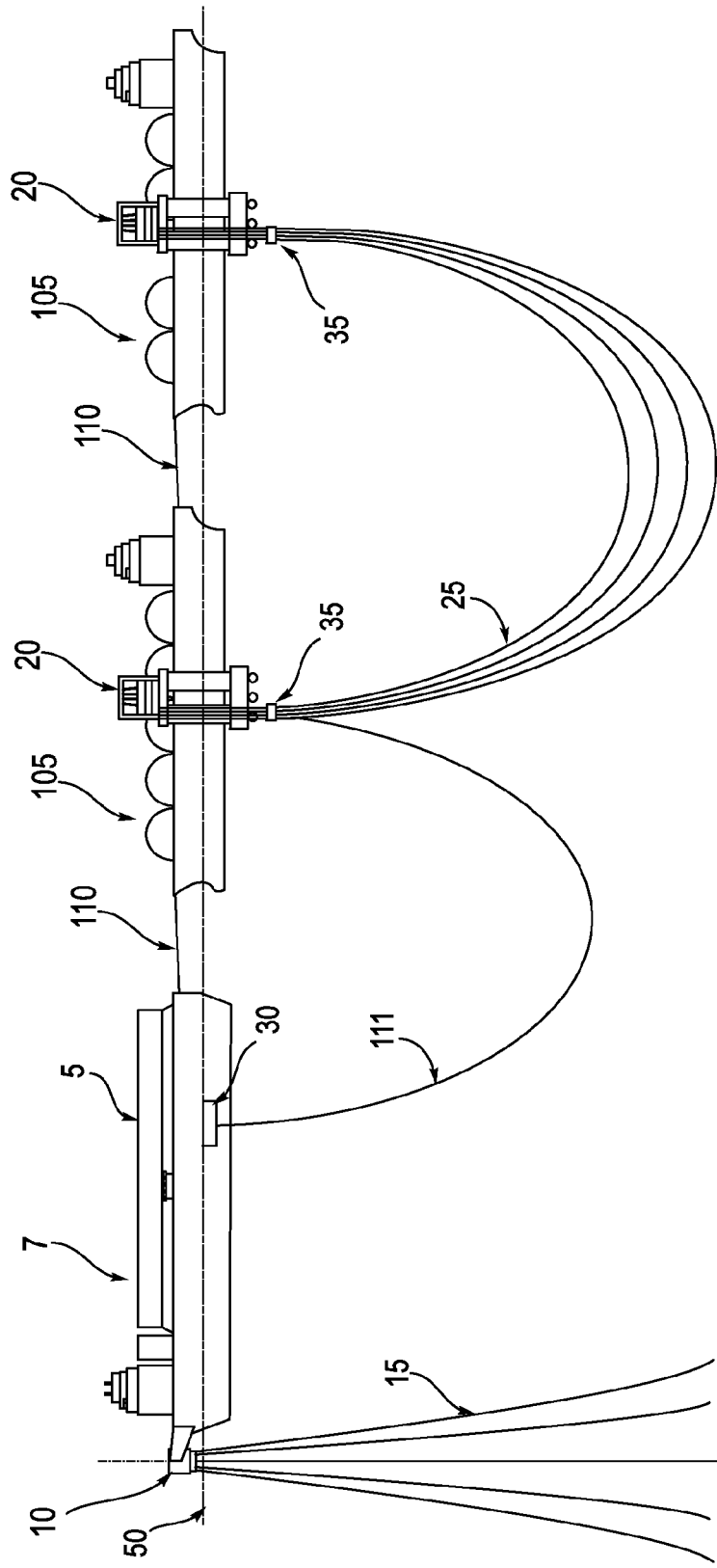
FIG. 6 illustrates one embodiment in which one transfer vessel is moored with one transport vessel and another transfer vessel is moored to another transport vessel.

FIG. 6 illustrates a mooring barge 7 and second and third fluid floating transport vessels 105 in tandem ship-to-ship mooring arrangement, with conduits 25 and a first and a second transfer vessel 20 in place for transferring a fluid from the second transport vessel 105 through the first transfer vessel 20 to the second transfer vessel 20 and onto the third transport vessel 105, and possibly onto the mooring barge 7. Alternatively, the fluid can be transferred from the third transport vessel 105 through the second transfer vessel to the first transfer vessel and onto the second transport vessel 105, and optionally onto the mooring barge. Also, as shown, an auxiliary power line 111 can be connected between the mooring barge and at least one of the transfer vessels 20. The auxiliary power line can supply additional power to the transfer vessels 20, i.e. for operation of booster pumps, thrusters, etc.

Figure 7:
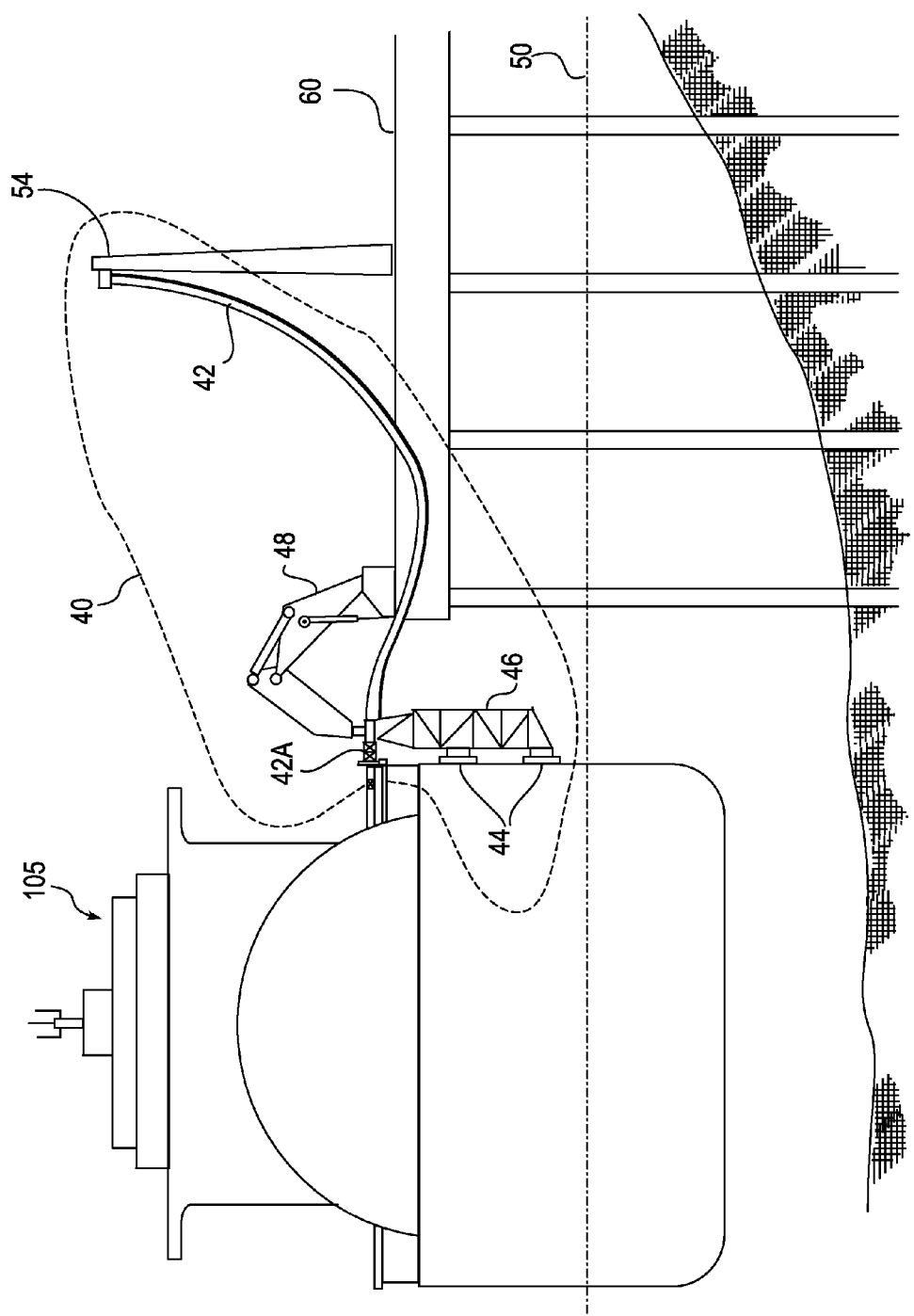
FIG. 7 illustrates one embodiment in which a fluid transfer system is utilized on a stationary structure, and the fluid conduits are connected to a floating transport vessel.

In one embodiment, as illustrated in FIG. 7, fluid may be transferred from a stationary structure 60 to a floating vessel 105 using the fluid transfer system 40 described herein, particularly including the fluid conduit 42, controllable deployment system comprising positioning arms 48 for adjusting the position of the fluid conduit end 42A and the mooring device comprising truss work 46 and mooring pads 44 capable of being attached to the floating vessel, on a stationary structure 60 rather than a floating transfer vessel. The stationary structure can be a dock, pier, a jetty, an offshore platform, gravity based structure (GBS) or any other non-floating structure. This embodiment may be particularly desirable in areas having rough metocean conditions in order to protect the equipment such as manifold flanges from high axial and shear stresses.

In another embodiment, the fluid is transferred between a floating transport vessel and a fixed deepwater assembly, for delivering the fluid to a land-based facility. The fixed assembly for delivering the fluid is anchored to the bottom of the seafloor to make it sufficiently stationary and robust for locating in the sea.

Figure 8:
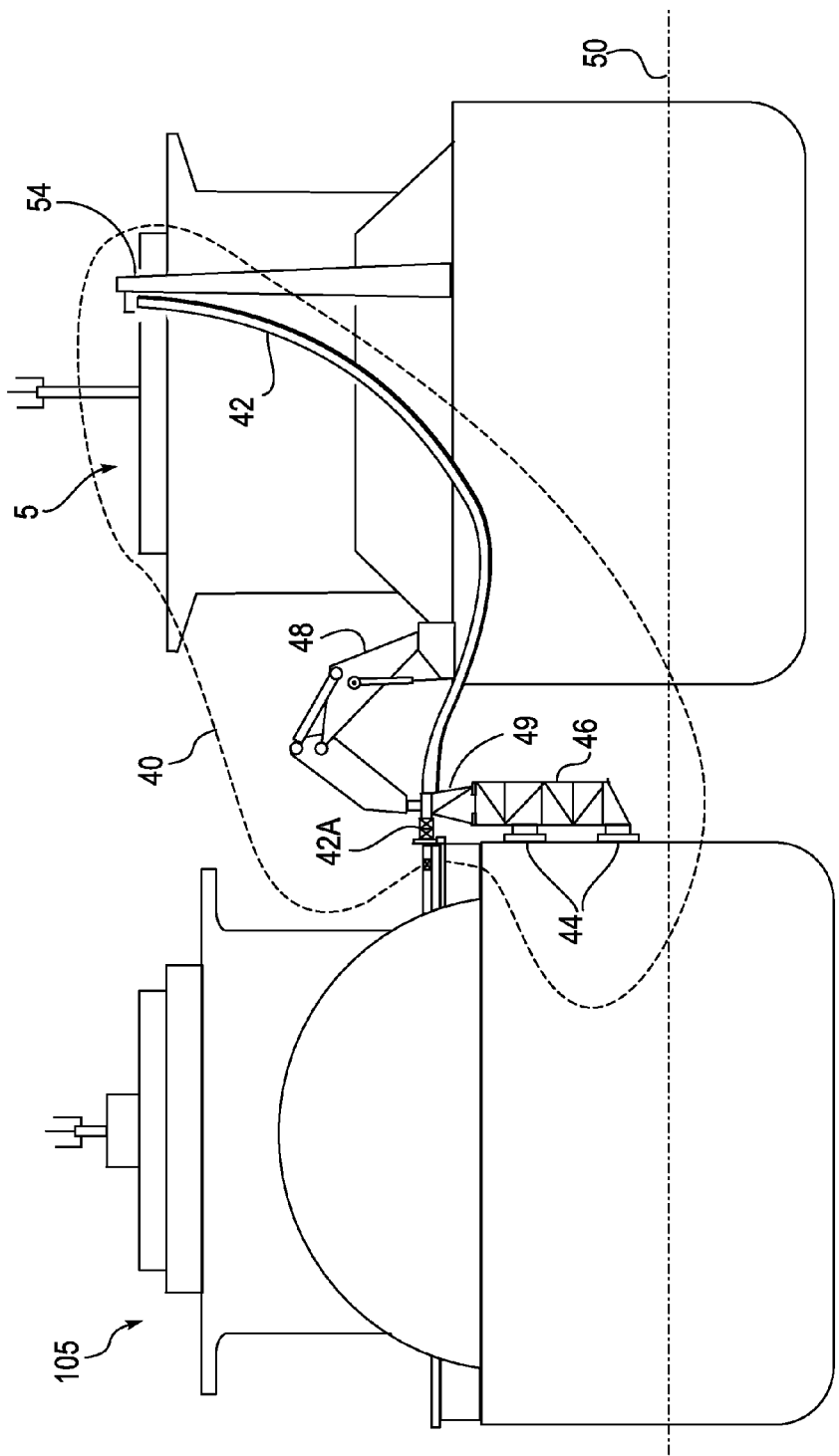
FIG. 8 illustrates one embodiment in which a fluid transfer system is utilized on a floating storage vessel, and the fluid conduits are connected to a floating transport vessel.

In another embodiment, as illustrated in FIG. 8, fluid may be transferred from a floating storage vessel 5 to a floating transport vessel 105, moored in a side-by-side arrangement, using the fluid transfer system 40 installed on the floating storage vessel 5.

In some embodiments, the disclosure provides for an emergency disconnection of the fluid transfer system which is under controlled, safe operation at all times. Two types of emergency systems can be utilized in the embodiments described herein. First, an emergency release system (ERS) can be integrated into the fluid transfer system, as part of the fluid conduit ends, and is utilized to release the fluid conduit ends from the manifold flange of the transport vessel in an emergency situation. In this event the QC/DC and one emergency block valve (half of the powered emergency release coupler, or PERC) stays on the transport vessel manifold flange. Second, the releasable moorings on the fluid transfer system can include an emergency system to release the moorings so that the transfer vessel can disengage and retract away from the transport vessel. It can be timed such that the transfer system moorings disengage after the fluid transfer ERS has released and retracted the fluid conduit out of the way. This allows the floating transport vessel to depart under fully controlled emergency conditions while mitigating the potential for damage to the transport vessel, the transfer vessel or the fluid conduits.

The particular embodiments disclosed above are illustrative only, and may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

What is claimed is:

1. A fluid transfer apparatus for accommodating the transfer of fluid between a floating first structure and a second structure, the apparatus comprising:
  a) a mooring device capable of being releasably attached to a floating first structure having a first structure conduit;
  b) a first controllable deployment system supported by a base, the controllable deployment system supporting the mooring device and capable of adjusting the position of the mooring device relative to the base;
  c) at least one fluid conduit displaceably supported relative to the mooring device and having a fluid conduit end adapted to be releasably connected to the first structure conduit; and
  d) a second controllable deployment system defined by a Stewart platform, which controls the displacement of the fluid conduit end relative to the mooring device to accommodate positioning of and fluid connection between the fluid conduit end and the first structure conduit;
  wherein the mooring device can be moved relative to the base by the first controllable deployment system so that the mooring device can be releasably attached to the floating first structure such that the mooring device moves with the floating first structure and the fluid conduit end can be displaced relatively to the mooring device to accommodate mating of the fluid conduit end with the first structure conduit.

2. The apparatus of claim 1 wherein the second controllable deployment system is adapted to be actuated by hydraulics or by an electro-mechanical device.

3. The apparatus of claim 1 wherein the first controllable deployment system can be operated in active control mode in which the position of the mooring device is actively adjusted, and in passive mode in which the mooring device is free to move relative to the base.

4. The apparatus of claim 1, wherein the first controllable deployment system comprises at least one controllable positioning arm.

5. The apparatus of claim 1, wherein the mooring device comprises at least one vacuum pad.

6. The apparatus of claim 1, wherein the mooring device comprises at least one electromagnet.

7. The apparatus of claim 1 further comprising a floating structure which carries the base of the first controllable deployment system.

8. The apparatus of claim 7 wherein the floating structure is a semi-submersible vessel.

9. The apparatus of claim 7, further comprising:
a positioning system capable of propelling the floating structure and maintaining the floating structure within a defined relative-position operating envelope with respect to the floating first structure.

10. A process for transferring fluid between a floating first structure and a second structure, the process comprising, in sequence:
operating a first controllable deployment system in active control mode to adjust the position of a mooring device supporting a fluid conduit end of at least one fluid conduit with respect to a first structure conduit on a floating first structure;
attaching the mooring device to the floating first structure;
disabling active control of the first controllable deployment system so that the first controllable deployment system is free to move relative to the mooring device thereby allowing the mooring device to move with the floating first structure;
individually adjusting the position of the fluid conduit end of the at least one fluid conduit with respect to the mooring device and to the first structure conduit using a second controllable deployment system defined by a Stewart platform;
fluidly connecting the fluid conduit end to the first structure conduit; and
transferring fluid between the floating first structure and the second structure through the at least one fluid conduit and first structure conduit.

11. The process of claim 10 wherein the fluid comprises one or more of liquefied natural gas, liquefied heavy gas, liquefied petroleum gas, compressed natural gas, natural gas, crude oil, gasoline, diesel, aviation fuel, fuel oil, synthetic crude, petroleum condensate, lubricating oil, synthetic lube oil, naphtha, and methanol and mixtures thereof.

12. The process of claim 10 wherein the at least one fluid conduit is in fluid communication with a third structure via at least one of a subsea catenary conduit, a floating conduit, a pipe supported by a floating jetty or arm, and a pipe supported by a subsea submerged jetty or arm.

13. The process of claim 12 wherein the third structure is selected from the group consisting of a floating storage vessel, a floating buoy or a storage tank.

14. The process of claim 10, further comprising controlled emergency shutdown of the transferring step, comprising:
ceasing the transferring of fluid by closing first and second emergency block valves on the fluid conduit end;
disconnecting the fluid conduit end from the first structure conduit by activating an emergency release system between the emergency block valves;
retracting the fluid conduit end and the first emergency block valve with respect to the first structure conduit and the second emergency block valve using the second controllable deployment system;
enabling active control of the first controllable deployment system;
detaching the mooring device from the floating first structure; and
retracting the fluid conduit end with respect to the first structure conduit using the first controllable deployment system in active control mode.

15. The process of claim 10 wherein the floating first structure is a floating transport vessel and the second structure is a floating storage vessel.

16. The process of claim 10 wherein the floating first structure is a floating transport vessel and the second structure is a stationary structure selected from the group consisting of a dock, a pier, a jetty, an offshore platform and a gravity based structure (GBS).

* * * * *